(12) United States Patent
Ramachandran

(10) Patent No.: US 9,685,698 B2
(45) Date of Patent: Jun. 20, 2017

(54) MULTI-TAP FREQUENCY SWITCHABLE ANTENNA APPARATUS, SYSTEMS AND METHODS

(71) Applicant: Pulse Finland OY, Oulunsalo (FI)

(72) Inventor: Prasadh Ramachandran, Oulu (FI)

(73) Assignee: PULSE FINLAND OY (FI)

( * ) Notice: Subject to any disclaimer, the term of this patent is extended or adjusted under 35 U.S.C. 154(b) by 0 days.

(21) Appl. No.: 14/877,393

(22) Filed: Oct. 7, 2015

(65) Prior Publication Data

US 2017/0104266 A1  Apr. 13, 2017

(51) Int. Cl.
| | |
|---|---|
| *H04B 1/40* | (2015.01) |
| *H01Q 1/50* | (2006.01) |
| *H01Q 5/20* | (2015.01) |
| *H04M 1/02* | (2006.01) |

(52) U.S. Cl.
CPC ............... *H01Q 1/50* (2013.01); *H01Q 5/20* (2015.01); *H04M 1/026* (2013.01)

(58) Field of Classification Search
CPC . A61B 5/14552; A61B 5/02416; A61B 5/021; A61B 5/1455; A61B 5/08; B60L 11/182; H01F 38/14; H02J 7/025
USPC ....... 455/73, 75, 88; 330/301; 600/324, 479; 315/159
See application file for complete search history.

(56) References Cited

U.S. PATENT DOCUMENTS

| | | | |
|---|---|---|---|
| 6,034,640 | A | 3/2000 | Oida et al. |
| 6,650,295 | B2 | 11/2003 | Ollikainen et al. |
| 7,099,690 | B2 | 8/2006 | Milosavljevic |
| 7,468,700 | B2 | 12/2008 | Milosavljevic |
| 8,564,485 | B2 | 10/2013 | Milosavljevic et al. |
| 8,618,990 | B2 | 12/2013 | Somero |
| 2005/0134518 | A1 | 6/2005 | Zimmerman et al. |
| 2008/0106481 | A1 | 5/2008 | Lin et al. |
| 2008/0158065 | A1 | 7/2008 | Wee |
| 2008/0180333 | A1 | 7/2008 | Martiskainen et al. |
| 2009/0167622 | A1 | 7/2009 | Yanagisawa et al. |
| 2009/0289721 | A1* | 11/2009 | Rajendran ............... H03F 3/195 330/301 |
| 2011/0207420 | A1* | 8/2011 | Rajendran ............... H03F 3/195 455/127.1 |
| 2011/0241951 | A1 | 10/2011 | Sakamoto et al. |

\* cited by examiner

*Primary Examiner* — Phuoc H Doan
(74) *Attorney, Agent, or Firm* — Gazdzinski & Associates, PC

(57) ABSTRACT

Multi-tap switchable antenna apparatus for use with mobile devices and other applications, and methods of utilizing the same. In one embodiment, the multi-tap switchable antenna apparatus includes a main radiator coupled to an antenna feed or source. Galvanically connected to the main radiator is a plurality of switchable antenna radiators which are in turn connected to an nPmT switch. The output of the nPmT switch can be connected to a variety of differing electronic component impedances. By altering the state of the nPmT switch, the operational length of the antenna (and hence, the operational frequency band of the antenna) can be varied. Performance characteristics associated with a given implementation of the multi-tap switchable apparatus are also disclosed.

20 Claims, 7 Drawing Sheets

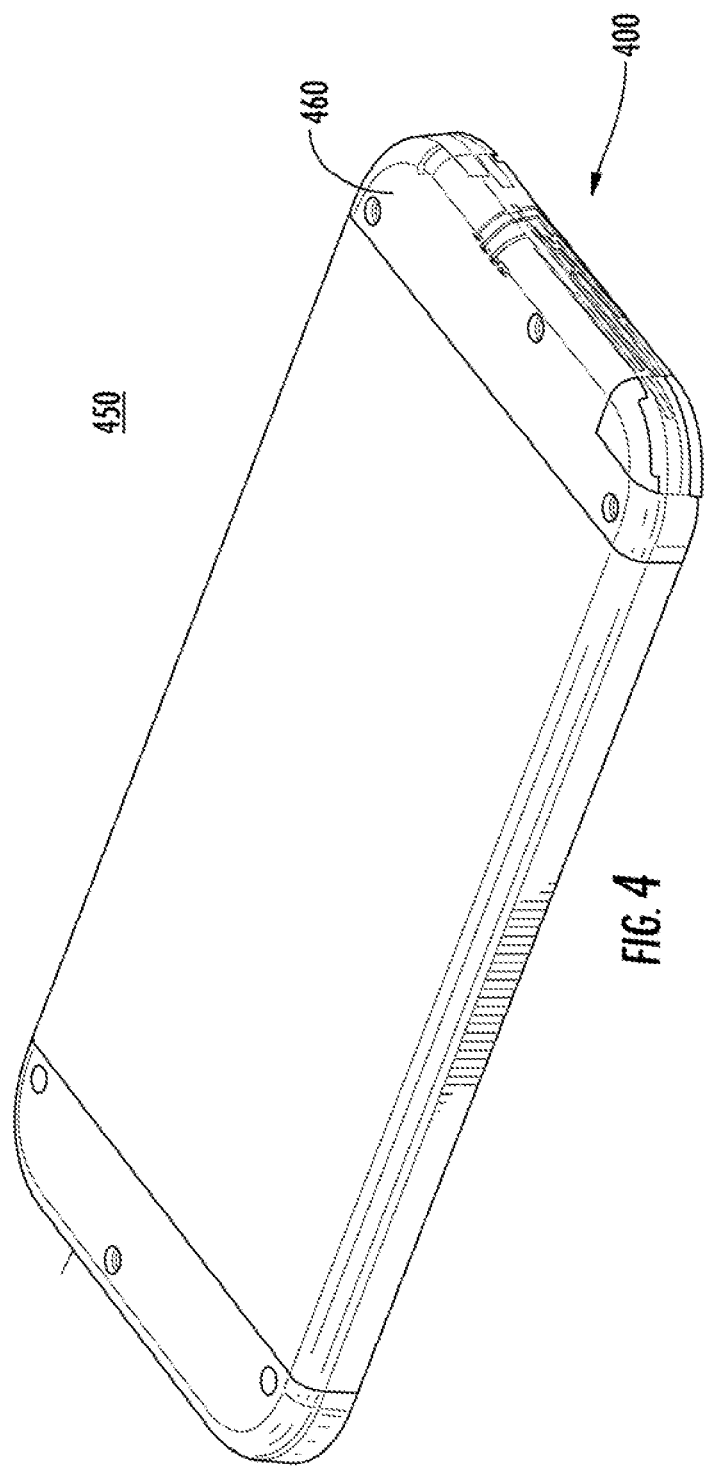

MULTI-TAP FREQUENCY SWITCHABLE ANTENNA APPARATUS, SYSTEMS AND METHODS

CROSS-REFERENCE TO RELATED APPLICATIONS

This application is related to co-owned U.S. patent application Ser. No. 13/086,319 filed Apr. 13, 2011 entitled "Wideband Antenna and Methods", now U.S. Pat. No. 8,618,990; and co-owned U.S. patent application Ser. No. 11/989,451 filed Jul. 13, 2006 entitled "Adjustable Multiband Antenna and Methods", now U.S. Pat. No. 8,564,485, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to antenna apparatus and systems for use in wireless devices, and more particularly in one exemplary aspect to a multi-tap frequency switchable antenna apparatus, and methods of operating and using the same.

2. Description of Related Technology

Various configurations of frequency switchable antenna apparatus are known in the related arts. For example, co-owned U.S. Pat. No. 8,564,485 to Milosavljevic et al. discloses an adjustable multi-band antenna for use in mobile terminals and radio devices. The adjustable multi-band antenna includes an adjusting circuit for the antenna that is galvanically connected to a point on a radiator. The adjusting circuit can affect the operation of the antenna in two operating bands and includes a multi-pole switch, by which the radiator point can be connected to one of alternative transmission lines. For example, one of two transmission lines is open and another shorted. A discrete capacitor can be located between the separate conductor of the transmission line and an output pole of the switch as an additive-tuning element. The adjusting circuit further includes an LC circuit disposed between the radiator and the switch. The lengths of the transmission lines, the values of the discrete components and the distance between the antenna short-circuit point and the adjusting circuit connecting point are then variables for the purposes of adjusting the operating band for the antenna. Various values are calculated for these variables such that the antenna operational bands are able to shift to a desired frequency when the switch state is changed.

As yet another example, co-owned U.S. Pat. No. 8,618,990 to Somero discloses a wideband antenna for use in portable radio devices. For example, a monopole antenna is used within a laptop computing device. The antenna includes a monopole radiator coupled to an auxiliary ground plane element and is placed outside of the footprint of the computer display ground plane. The auxiliary ground element is configured not to have electrical connections to the ground plane of the laptop computer. Alternatively, a solid state switch selectively connects an antenna parasitic element to the main ground thus enabling selective control of the antenna lower frequency operating band.

For each of the foregoing variety of antenna configurations, although the desired frequency bands for the antennas are switchable, the overall operational bands for these antennas are relatively narrow and the number of available operational bands is limited. Moreover, due to the overall volume constraints available within widely available extant mobile terminals and wireless devices, the electrical dimensions available for these switchable antennas are limited. Hence, there is a salient need for an improved antenna system that is constructed so as to improve upon the flexibility in operational band usage over prior art devices, while simultaneously occupying a limited volume within existing mobile terminals and wireless devices.

SUMMARY

The present disclosure satisfies the foregoing by providing an improved antenna device, system, and methods of operating and utilizing the same.

In a first aspect, a multi-tap switchable antenna apparatus is disclosed. In one embodiment, the multi-tap switchable antenna apparatus includes a main antenna radiator branch; a plurality of switchable antenna radiator branches; and a switching apparatus. Each of the plurality of switchable antenna radiator branches are coupled to the switching apparatus in order to effectuate a plurality of operational frequency bands for the multi-tap switchable antenna apparatus.

In one variant, each of the plurality of switchable antenna radiator branches are connected to the main antenna radiator branch.

In another variant, each of the plurality of switchable antenna radiator branches are connected at differing discrete points that are spatially located along the main antenna radiator branch.

In yet another variant, the switching apparatus comprises an nPmT switch, where n is greater than one and m is greater than one.

In yet another variant, the values of n and m are equal to one another.

In yet another variant, the values of n and m differ from one another.

In yet another variant, a plurality of electronic component impedances are each coupled to a given output of the switching apparatus.

In yet another variant, the plurality of electronic component impedances are configured to effectuate a dual resonance in at least one operational frequency band.

In yet another variant, the switching apparatus includes a plurality of discrete switching devices that are distributed spatially across the multi-tap switchable antenna apparatus.

In yet another variant, each of the plurality of discrete switching devices are comprised of an nPmT switch.

In yet another variant, at least a portion of the nPmT switches have a value for n and m that are equal to one another.

In yet another variant, at least a portion of the nPmT switches have a value for n and m that differ from one another.

In a second aspect, a wireless device that incorporates a multi-tap switchable antenna apparatus is disclosed. In one embodiment, the wireless device is a mobile wireless device that includes a mobile device housing having an antenna frame element disposed therein and a multi-tap switchable antenna apparatus. The multi-tap switchable antenna apparatus includes a main antenna radiator branch disposed on the antenna frame element; a plurality of switchable antenna radiator branches, each of the plurality of switchable antenna radiator branches being disposed on the antenna frame element; and a switching apparatus. The switching apparatus and the plurality of switchable antenna radiator branches are configured to selectively alter an operative length for the multi-tap switchable antenna apparatus.

In one variant, the selective alteration of the operative length for the multi-tap switchable antenna apparatus is configured to alter an operational frequency band for the mobile wireless device.

In another variant, the multi-tap switchable antenna apparatus is disposed in a non-preferred grasping location for the mobile wireless device.

In yet another variant, the switching apparatus is configured to effectuate at least four operational frequency bands for the multi-tap switchable antenna apparatus.

In yet another variant, the at least four operational frequency bands comprises a 600 MHz frequency band, a 640 MHz frequency band, a 790 MHz frequency band, and a 900 MHz frequency band.

In yet another variant, a plurality of electronic component impedances are each coupled to a given output of the switching apparatus.

In yet another variant, the plurality of electronic component impedances are configured to effectuate a dual resonance in at least one operational frequency band.

In a third aspect, methods of using the aforementioned multi-tap switchable antenna apparatus are disclosed. In one embodiment, the method includes coupling a main antenna radiator branch to a feed point; coupling a plurality of switchable antenna radiator branches to the switching apparatus; and selectively altering a switching state for the switching apparatus in order to effectuate an operational band change for the antenna apparatus.

In a fourth aspect, methods of using the aforementioned wireless device are disclosed.

In a fifth aspect, methods of operating the aforementioned multi-tap switchable antenna apparatus are disclosed.

In a sixth aspect, methods of operating the aforementioned wireless device are disclosed.

BRIEF DESCRIPTION OF THE DRAWINGS

The features, objectives, and advantages of the present disclosure will become more apparent from the detailed description set forth below when taken in conjunction with the drawings, wherein:

FIG. 4 is a perspective view of a wireless mobile device that implements the multi-tap switchable antenna apparatus of FIG. 1 in accordance with the principles of the present disclosure.

Figure 1:
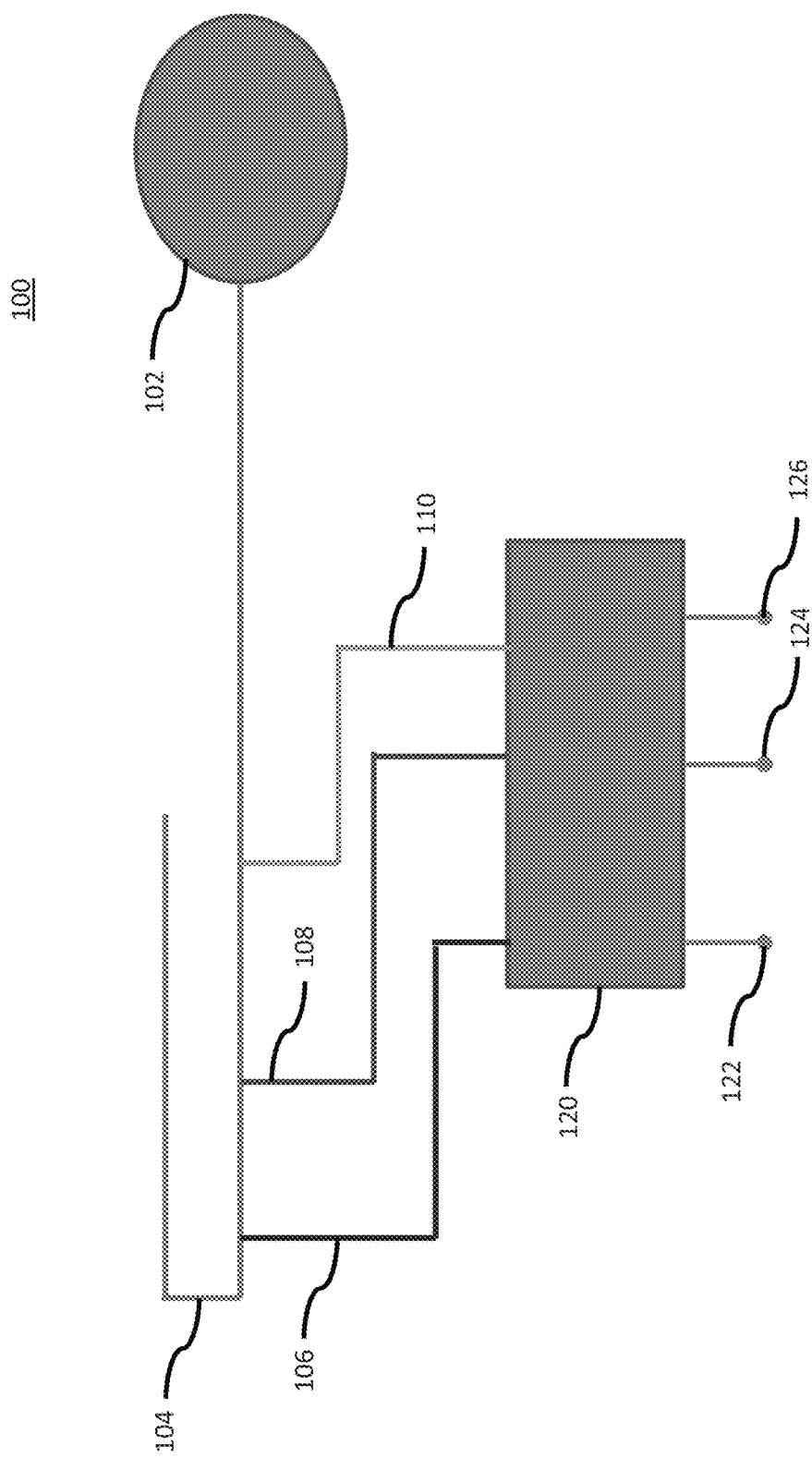
FIG. 1 is a generalized schematic diagram of an exemplary implementation of a multi-tap switchable antenna apparatus in accordance with the principles of the present disclosure.

All Figures disclosed herein are ©2015 Pulse Finland Oy. All rights reserved.

DETAILED DESCRIPTION OF EXEMPLARY EMBODIMENTS

Reference is now made to the drawings wherein like numerals refer to like parts throughout.

The terms "antenna," "antenna system," and "multi-band antenna" as used herein refer generally and without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from location to another location, using or more repeater links, and one or more locations may be mobile, stationary, or fixed to a location on earth such as a base station.

As used herein, the terms "board" and "substrate" refer generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

The terms "connect," "galvanically connect," "fed," and "grounded" refer generally and without limitation to direct physical and/or electrical connection between any two elements (for example: a radiator and a ground), while the term "electromagnetically couple" refers generally and without limitation to electromagnetic field coupling between two elements that are not in a direct electrical contact with each other.

As used herein, the term "electronic component" is used to refer to components adapted to provide some electrical function, including without limitation inductive reactors ("choke coils"), transformers, filters, gapped, core toroids, inductors, capacitors, resistors, operational amplifiers, and diodes, whether discrete components or integrated circuits, whether alone or in combination.

The term "frequency band" refers generally and without limitation to any frequency range for communicating signals. Such signals may be communicated pursuant to one or more standards or wireless air interfaces.

The term "feed" refers generally and without limitation to any energy conductor and coupling element(s) that can transfer energy, transform impedance, enhance performance characteristics, and conform impedance properties between an incoming/outgoing RF energy signals to that of one or more connective elements, such as for example a radiator.

Furthermore, as used herein, the term "radiator" refers generally and without limitation to an element that can function as part of a system that receives and/or transmits radio-frequency electromagnetic radiation; e.g., an antenna.

As used herein, the terms "top," "bottom," "side," "up," "down" and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems, millimeter wave or microwave systems, optical, acoustic, and infrared (i.e., IrDA).

As used herein, the terms "wireless device", "mobile device", and the like include, but are not limited to, personal computers (PCs) and minicomputers, whether desktop, laptop, or otherwise, set-top boxes, personal digital assistants (PDAs), handheld computers, personal communicators, tablet computers, portable navigation aids, J2ME equipped devices, cellular telephones, smartphones, personal integrated communication or entertainment devices, or literally any other device capable of interchanging data with a network or another device.

Overview

The present disclosure provides, in one salient aspect, methods and apparatus for implementing multi-tap switchable antenna apparatus within a wireless device, such as e.g., within "thin" devices such as smartphones, tablets, and laptop computers.

In one implementation, the multi-tap switchable apparatus includes a main radiator coupled to an antenna feed or source. Galvanically connected to the main radiator is a plurality of switchable antenna radiators which are in turn connected to an nPmT switch where "n" is greater than one and "m" is also greater than one. The value of "n" and "m" can be equal to one another, or alternatively, may differ in value from one another in alternative variants. The output of the nPmT switch can be connected to a variety of differing electronic component impedances. For example, a given switch output can be coupled to a resistive impedance (i.e., a resistor), a capacitive impedance (i.e., a capacitor), an inductive impedance (i.e., an inductor), or can be left in an "open" state, or alternatively, be shunted to ground. Moreover, a given switch output can include a combination of impedances (e.g., a combination of a capacitive and an inductive impedance). By altering the state of the nPmT switch, the operational length of the antenna (and hence, the operational frequency band of the antenna) can be varied.

Performance characteristics associated with a given implementation of the multi-tap switchable apparatus are also disclosed.

DETAILED DESCRIPTION OF EXEMPLARY EMBODIMENTS

It will be recognized that while the following discussion is cast primarily in terms of antennas for use with, for example, mobile devices, and specifically in one or more embodiments described herein to applications that utilize various radio frequency bands for cellular communication, the principles of the present disclosure are not so limited. The principles of the present disclosure are useful in any number of end applications that can benefit from configurations of multi-pole, multi-throw switches described herein such as, for example and without limitation, wireless communication such as Bluetooth, Wi-Fi, cellular telephony in various countries, and other applications which operate at specific frequency bands.

Exemplary Antenna Apparatus and Mobile Device—

Referring now to FIG. 1, a generalized schematic diagram of an exemplary implementation of a multi-tap switchable antenna apparatus 100 in accordance with the principles of the present disclosure is shown and described in detail. In the illustrated embodiment, an antenna feed or source 102 of a radio frequency (RF) front end for a wireless device is shown coupled to a main antenna radiator branch 104. The source 102 is capable of transmitting and/or receiving wireless signals and can be utilized for a variety of differing wireless devices. The main antenna radiator 104 is illustrated as including a defined electrical length and further includes multiple bends so as to, inter alia, increase the available electrical length for the main antenna radiator. However, the width/length of the main antenna radiator can readily be varied so as to resonate at a desired operational frequency band. For example, the main antenna radiator can include the physical attributes of the radiators illustrated within U.S. patent application Ser. No. 13/086,319 filed Apr. 13, 2011 entitled "Wideband Antenna and Methods", now U.S. Pat. No. 8,618,990; and co-owned U.S. patent application Ser. No. 11/989,451 filed Jul. 13, 2006 entitled "Adjustable Multiband Antenna and Methods", now U.S. Pat. No. 8,564,485, each of the foregoing previously incorporated herein by reference supra.

Galvanically coupled to the main antenna radiator branch 104 are switchable antenna radiator branches 106, 108, 110. Similar to the main antenna radiator branch, each of the switchable antenna radiator branches can include a variety of width/length combinations so as to vary the electrical dimension/length of the antenna apparatus 100 and hence modify the path of the surface currents for the antenna apparatus. By varying the electrical dimension/length, the antenna apparatus can resonate at a desired operational frequency band when utilized in conjunction with the main antenna radiator 104. While the antenna apparatus 100 is illustrated as including three switchable antenna radiator branches 106, 108, and 110, it is readily appreciated that the number of switchable antenna radiator branches can be varied in order to accommodate a given antenna design with the illustration of three switchable antenna radiator branches merely being exemplary. Each of the switchable antenna radiator branches is coupled to an input of an nPmT switch 120, where "n" is greater than one and "m" is also greater than one. The value of "n" and "m" can be equal to one another as illustrated, or alternatively, may differ in value from one another in alternative variants.

Moreover, although each of the switchable antenna radiator branches 106, 108, 110 are shown as being coupled directly to the main antenna radiator branch 104, it is readily appreciated that in alternative implementations that one or more of the switchable antenna radiator branches 106, 108, 110 may be coupled to other one(s) of the switchable antenna radiator branches as opposed to being coupled directly to the main antenna radiator branch. For example, switchable antenna radiator branch 108 may be coupled to switchable antenna radiator branch 106 which is in turn coupled to the main antenna radiator branch 104. These and other variants would be readily appreciated by one of ordinary skill given the contents of the present disclosure.

Referring back to the illustrated embodiment of FIG. 1, the switch 120 is a three-pole three-throw (3P3T) switch having nine (9) to twelve (12) different switching states. In other words, each of switchable antenna radiator branches 106, 108, 110 may be coupled to any one of the three differing switch outputs 122, 124, 126 resulting in a total of nine (9) different switching states, i.e. three inputs multiplied by three outputs. Additionally, the switch may optionally include an "all open" state in which any one of the switchable antenna radiator branches 106, 108, 110 is not coupled to any of the switch outputs 122, 124, 126 thereby resulting in a total of twelve (12) different possible state combinations. Each of these twelve (12) different switching states results in a differing electrical length for the antenna apparatus and hence a differing operational band (i.e., a differing center frequency for a given band) for the antenna apparatus 100 depending upon the specific switching state chosen.

Moreover, while the illustrated configuration is useful in affecting the center frequency for the antenna apparatus, in instances where the switch pole of the switch is connected to a coupled arm of the antenna apparatus 100, the resultant antenna apparatus can be utilized in order to affect the effective bandwidth of the resonance by creating a dual resonance. In other words, the use of the switching apparatus 120 cannot increase the bandwidth of a single resonance; rather the bandwidth can be effectively increased as a result of an exemplary dual resonance structure. The dual resonance can be achieved by adding impedance components at the switch outputs 122, 124, 126. For example, in one exemplary embodiment, switch output 122 will be connected to ground and switch output 126 can have an inductive or capacitive impedance attached thereto. In this instance, the effective "short" on switch output 122 will control the antenna length and the component located at switch output 126 will act as a matching stub. The value of the impedance associated with the matching stub combined with the overall antenna impedance will create a dual resonance structure.

As previously alluded to, the switch outputs 122, 124, 126 can each be coupled to a variety of differing electronic component impedances. For example, a given switch output (e.g., switch output 122) can be coupled to a resistive impedance (i.e., a resistor), a capacitive impedance (i.e., a capacitor), an inductive impedance (i.e., an inductor), or can be left in an "open" state, or alternatively, be shunted to ground. Moreover, a given switch output can include a combination of impedances (e.g., a combination of a capacitive and an inductive impedance). In one exemplary implementation, switch output 122 is coupled to an inductive impedance; switch output 124 is coupled to ground; while switch output 126 is coupled to an "open" impedance. However, this specific implementation example is not meant to be limiting, rather the aforementioned examples are merely intended to illustrate the versatility of arrangements that are possible.

Such a structure as illustrated in FIG. 1 results in an antenna apparatus 100 in which the overall operational band for the antenna is increased. Moreover, as the electrical dimension/length for the antenna apparatus can readily be varied via inclusion of the switching apparatus 120, the antenna apparatus not only is able to switch the radiation efficiency for the antenna apparatus across its overall operational band, but also enables the antenna apparatus to be accommodated into a smaller overall volume than would be possible in implementations in which the exemplary switching apparatus 120 and multiple switchable antenna radiator branches 106, 108, 110 is absent.

In alternative embodiments, the above-described implementation that includes a single switching apparatus 120 may be modified so as to include several switches distributed spatially across the antenna radiator. For example, several single-pole single-throw (SPST) and/or single-pole double-throw (SPDT) switches may be connected to each of the switchable antenna radiators 106, 108, 110.

Figure 2:
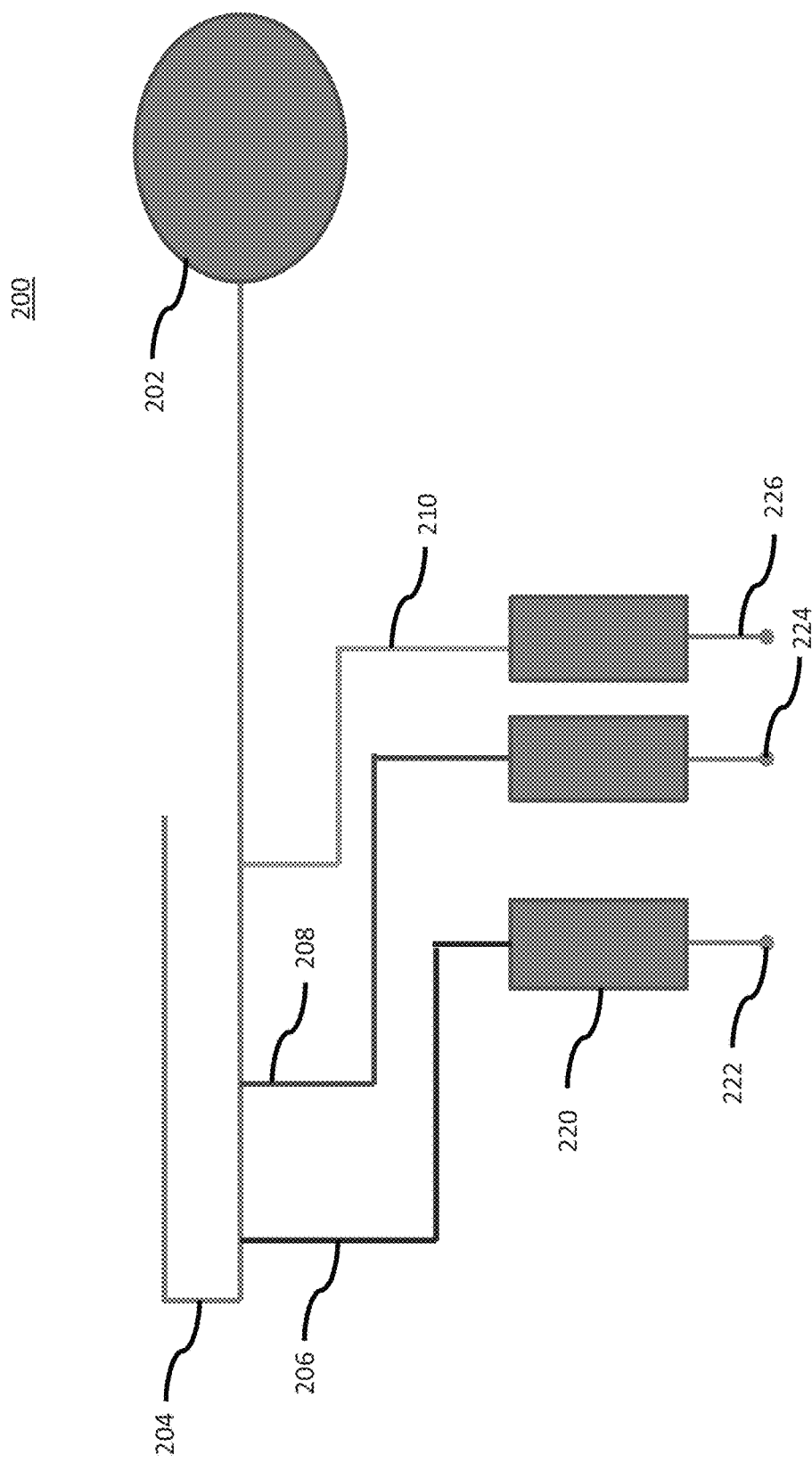
FIG. 2 is a generalized schematic diagram of an exemplary implementation of a multi-tap switchable antenna apparatus utilizing single-pole single-throw switches in accordance with the principles of the present disclosure.

For example, FIG. 2 illustrates an exemplary embodiment of a multi-tap switchable antenna apparatus 200 utilizing single-pole single-throw (SPST) switches 220 distributed spatially along a main antenna radiator branch 204 fed by a source 202. In this implementation, each of three switchable radiator branches 206, 208, 210 connects to a SPST switch, each having one input and one output (e.g., switch outputs 222, 224, 226). Such a distributed configuration may allow greater flexibility in implementing a switchable antenna given limited physical volume of, e.g., a mobile device, as well as provide a similar number of switchable states available. Although FIG. 2 illustrates three SPST switches, the antenna may utilize fewer or more switches as desired.

Figure 3:
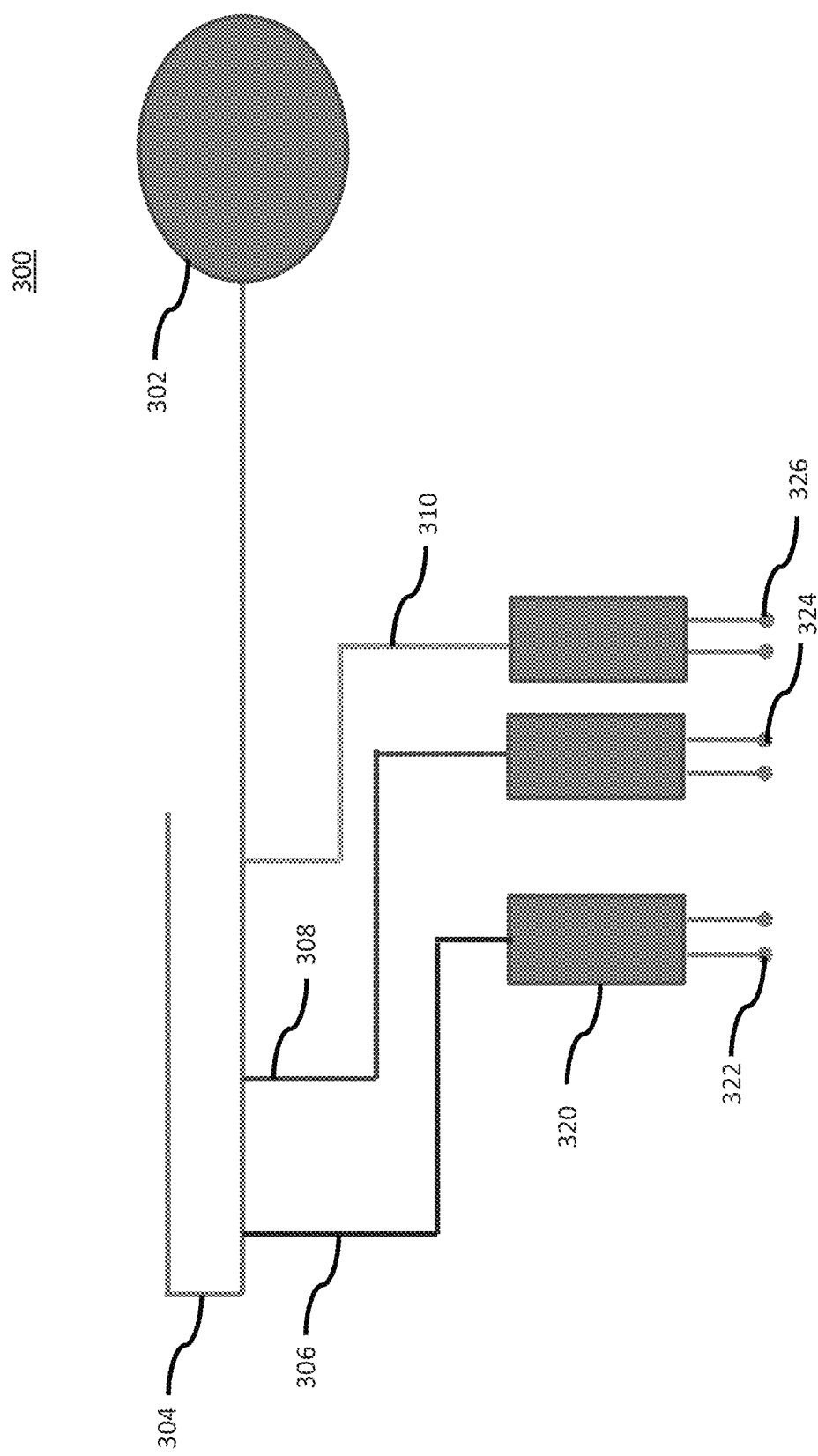
FIG. 3 is a generalized schematic diagram of an exemplary implementation of a multi-tap switchable antenna apparatus utilizing single-pole double-throw switches in accordance with the principles of the present disclosure.

FIG. 3 illustrates an exemplary embodiment of a multi-tap switchable antenna apparatus 300 utilizing single-pole double-throw (SPDT) switches 320 distributed spatially along a main antenna radiator branch 304 fed by a source 202. Each of three switchable radiator branches 306, 308, 310 acts as an input for a respective SPDT switch. By virtue of having two outputs per each of the three discrete switches, greater physical flexibility is achieved while maintaining significant versatility in available operational bands offered by the antenna apparatus 300. That is to say, each switch 320 having two outputs (e.g., 322, 324 or 326) increases the available number of switching states as compared with the embodiment utilizing SPST switches as illustrated in FIG. 2. Moreover, one having ordinary skill in the art will appreciate that the number of switches and the number of outputs may be increased or decreased based on various technical design considerations given the contents of the present disclosure.

Figure 4A:
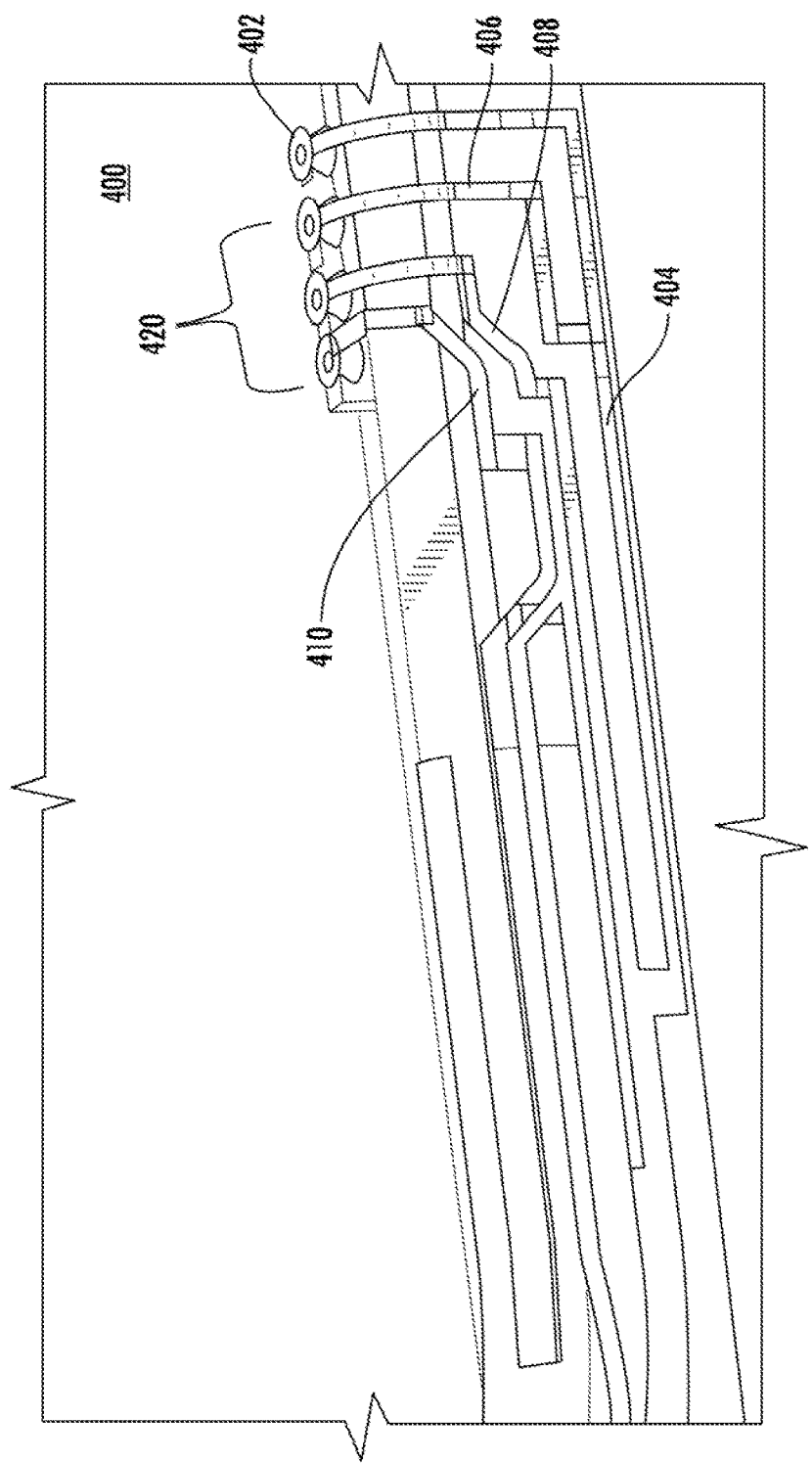
FIG. 4A is a detail view of the multi-tap switchable antenna apparatus of FIG. 4 in accordance with the principles of the present disclosure.

Referring now to FIGS. 4 and 4A, an exemplary mobile wireless device 450 is illustrated which incorporates a multi-tap switchable antenna apparatus 400 in accordance with the principles of the present disclosure. As shown, the antenna apparatus is disposed on the bottom edge of the mobile wireless device. Such placement is advantageous in that the positioning of the antenna apparatus is located in a non-preferred user grasping position. In other words, users of the mobile device typically will grasp the mobile device along the longer edges, rather than grasping by the bottom edge. By positioning the antenna apparatus in this non-preferred user grasping position, dielectric loading on the antenna by a user's hand is avoided. Nevertheless, the multi-tap antenna as disclosed herein may be positioned and used along any edge of the device based on design or functional preferences (e.g., advantageous electrical lengths and various switching states, etc.).

Referring back to FIG. 4, the overall dimensions of the exemplary mobile wireless device is 132 mm×66 mm (5.2 inch×2.6 inch) with the switchable antenna apparatus having a 5 mm (0.2 inch) ground clearance from the ground plane (not shown). In the illustrated embodiment, the ground plane is oriented to fit along the entire planar dimension of the wireless device and is located on a board or substrate. The mobile wireless device includes an antenna frame 460 that accommodates the structure of the multi-tap switchable antenna apparatus. The antenna frame 460 may be constructed from any non-metallic material.

Referring now to FIG. 4A, the switchable antenna apparatus includes an antenna feed or source 402 of a radio frequency (RF) front end for the mobile wireless device 450. This feed is capable of transmitting and/or receiving wireless RF signals to the antenna apparatus. The switchable antenna apparatus also includes a main antenna radiator branch 404 that is located close to the front of the mobile wireless device as well as three (3) switchable antenna radiator branches 406, 408, 410 which are each positioned between the back of the mobile wireless device and the main antenna radiator branch. Each of the switchable antenna radiator branches is, in the illustrated embodiment, coupled to the input 420 of a 3P3T switch. The operation of the multi-tap switchable antenna apparatus is as described with regards to FIG. 1.

Performance

Figure 5:
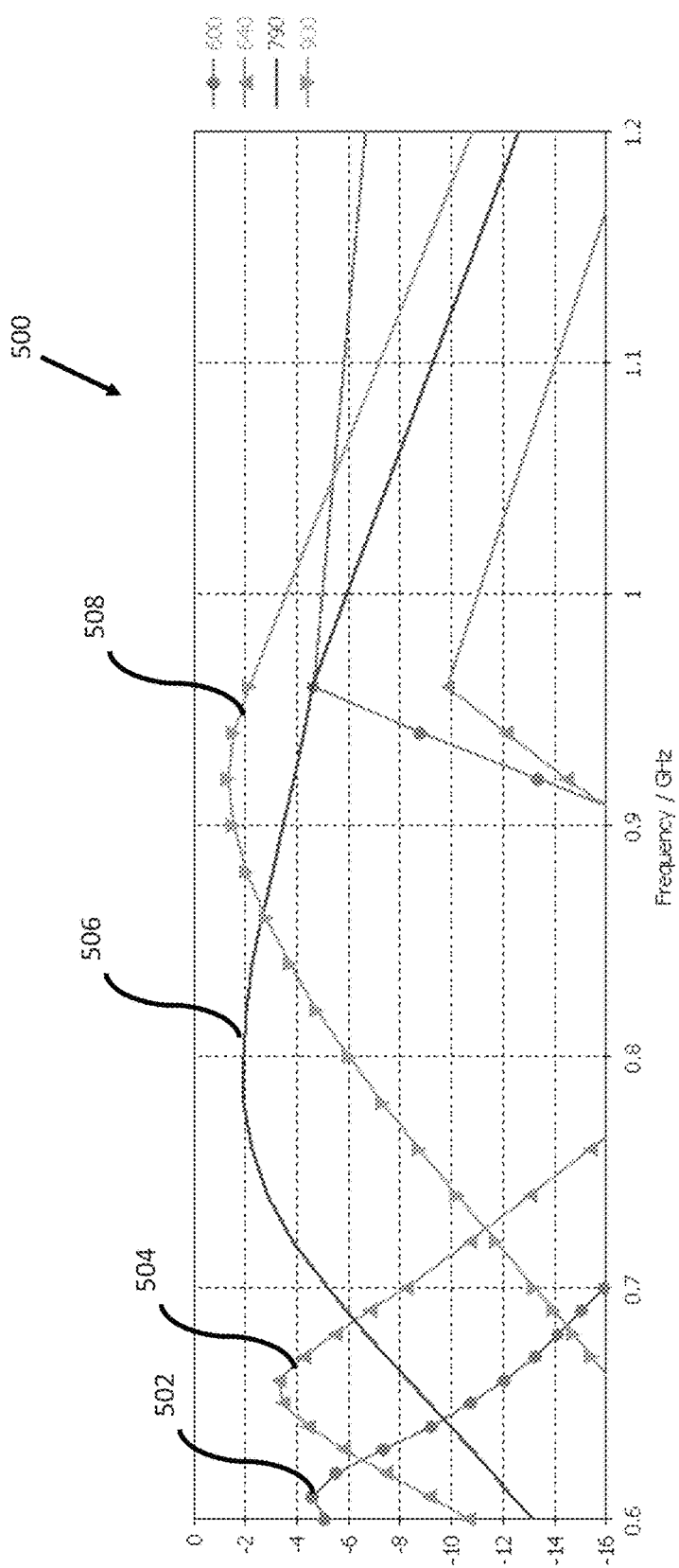
FIG. 5 is a graph showing antenna (total) efficiency as a function of frequency for the exemplary embodiment illustrated in FIGS. 4 and 4A in accordance with the principles of the present disclosure.

Referring now to FIG. 5, performance results obtained during testing by the Assignee hereof of an exemplary antenna apparatus constructed in accordance with the present disclosure are shown. Specifically, graph 500 represents total antenna efficiency as a function of frequency for the exemplary embodiment of FIGS. 4 and 4A. Four (4) different exemplary states (out of a possible twelve (12) states) are shown. The multi-tap switchable antenna apparatus as described herein allows convenient switching among discrete operational frequencies. For example, curve 502 corresponding to an operational frequency of 600 MHz (configured by the 3P3T switch 420 of the antenna 400) has a total antenna efficiency of approximately −4 dB at approximately 600 MHz. Curve 504 corresponding to an operational frequency of 640 MHz has a total antenna efficiency of approximately −3 dB at approximately 640 MHz. Curve 506 corresponding to an operational frequency of 790 MHz has a total antenna efficiency of approximately −2 dB at approximately 790 MHz. Curve 508 corresponding to an operational frequency of 900 MHz has a total antenna efficiency of approximately −1 dB at approximately 900 MHz.

Figure 6:
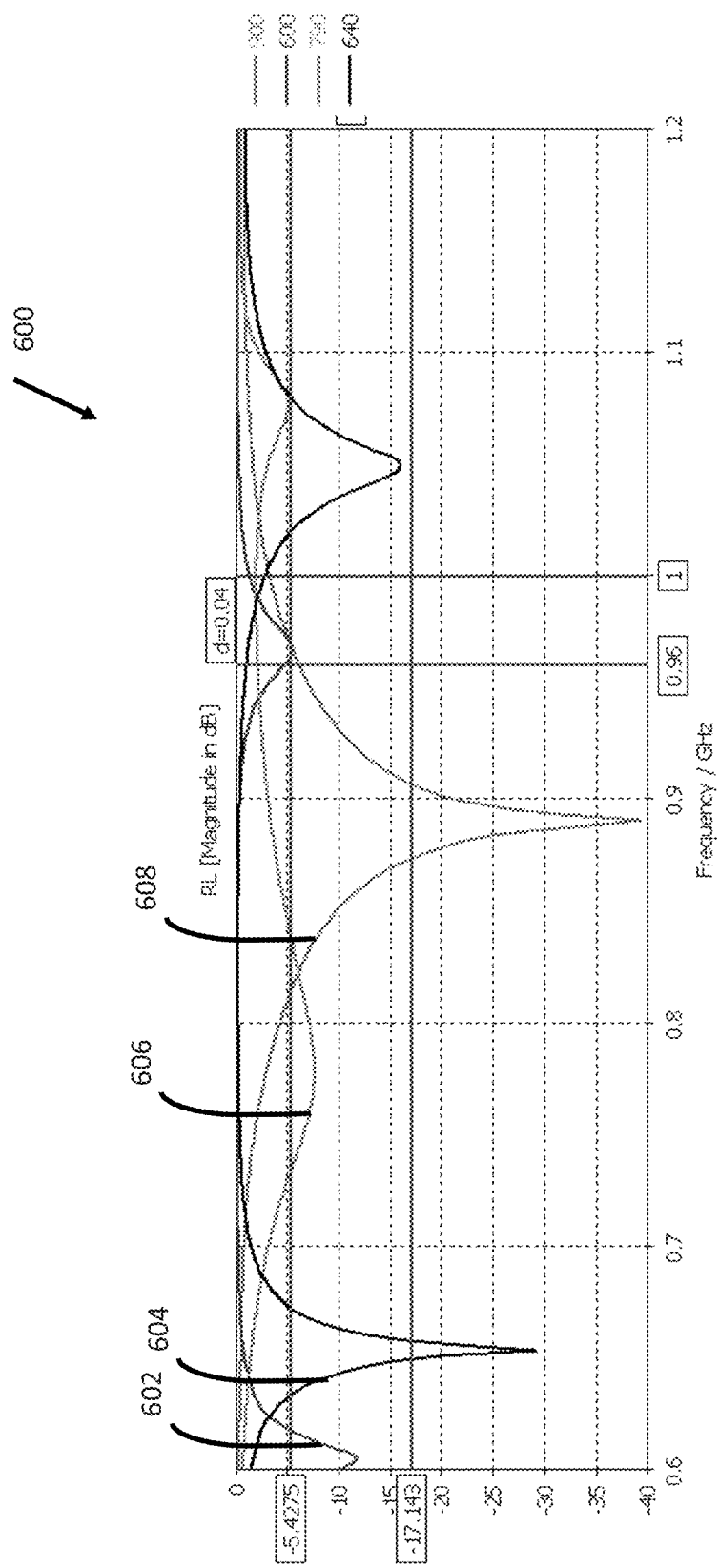
FIG. 6 is a graph showing return loss as a function of frequency for the exemplary embodiment illustrated in FIGS. 4 and 4A in accordance with the principles of the present disclosure.

Referring now to FIG. 6, performance results obtained during testing by the Assignee hereof of an exemplary antenna apparatus constructed in accordance with the present disclosure are shown. Specifically, graph 600 illustrates return loss as a function of frequency for the exemplary embodiment of FIGS. 4 and 4A. Moreover, return loss is illustrated as a function of frequency for each of the operational bands of 600 MHz, 640 MHz, 790 MHz and 900 MHz as described above with reference to FIG. 5. As illustrated, curve 602 denotes a return loss of approximately −12 dB at 600 MHz; curve 604 denotes a return loss of approximately −30 dB at 640 MHz; curve 606 denotes a return loss of approximately −8 dB at 790 MHz; and curve 608 denotes a return loss of approximately −40 dB at 900 MHz.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A multi-tap switchable antenna apparatus, comprising:
   a main antenna radiator branch;
   a plurality of switchable antenna radiator branches; and
   a switching apparatus comprising a plurality of input interfaces and a plurality of output interfaces, each of the plurality of input interfaces being coupled to a respective one of the plurality of switchable antenna radiator branches, each of the plurality of output interfaces being accessible to each of the plurality of input interfaces;
   wherein each of the plurality of input interfaces is configured to selectively couple to at most one of the plurality of output interfaces; and
   wherein the coupling of each of the plurality of switchable antenna radiator branches to the switching apparatus is configured to effectuate a plurality of operational frequency bands for the multi-tap switchable antenna apparatus.

2. The antenna apparatus of claim 1, wherein each of the plurality of switchable antenna radiator branches are connected to the main antenna radiator branch.

3. The antenna apparatus of claim 2, wherein each of the plurality of switchable antenna radiator branches are connected at differing discrete points that are spatially located along the main antenna radiator branch.

4. The antenna apparatus of claim 3, wherein the switching apparatus comprises an nPmT switch, where n is greater than one and m is greater than one.

5. The antenna apparatus of claim 4, wherein the values of n and m are equal to one another.

6. The antenna apparatus of claim 4, wherein the values of n and m differ from one another.

7. The antenna apparatus of claim 1, further comprising a plurality of electronic component impedances that are each coupled to a given output of the switching apparatus.

8. The antenna apparatus of claim 7, wherein the plurality of electronic component impedances are configured to effectuate a dual resonance in at least one operational frequency band.

9. The antenna apparatus of claim 1, wherein the switching apparatus comprises a plurality of discrete switching devices that are distributed spatially across the multi-tap switchable antenna apparatus.

10. The antenna apparatus of claim 9, wherein each of the plurality of discrete switching devices are comprised of an nPmT switch.

11. The antenna apparatus of claim 10, wherein at least a portion of the nPmT switches have a value for n and m that are equal to one another.

12. The antenna apparatus of claim 10, wherein at least a portion of the nPmT switches have a value for n and m that differ from one another.

13. A mobile wireless device, comprising:
   a mobile device housing having an antenna frame element disposed therein; and
   a multi-tap switchable antenna apparatus, comprising:
     a main antenna radiator branch disposed on the antenna frame element;

a plurality of switchable antenna radiator branches, each of the plurality of switchable antenna radiator branches being disposed on the antenna frame element; and a switching apparatus comprising a plurality of inputs and a plurality of outputs, each of the plurality of switchable antenna radiator branches being respectively coupled to one of the plurality of inputs;

wherein the switching apparatus and the plurality of switchable antenna radiator branches are configured to selectively alter an operative length for the multi-tap switchable antenna apparatus via a selective coupling of each of the plurality of inputs to at most one of the plurality of outputs.

14. The mobile wireless device of claim 13, wherein the selective alteration of the operative length for the multi-tap switchable antenna apparatus is configured to alter an operational frequency band for the mobile wireless device.

15. The mobile wireless devices of claim 14, wherein the multi-tap switchable antenna apparatus is disposed in a non-preferred grasping location for the mobile wireless device.

16. The mobile wireless device of claim 14, wherein the switching apparatus is configured to effectuate at least four operational frequency bands for the multi-tap switchable antenna apparatus.

17. The mobile wireless device of claim 16, wherein the at least four operational frequency bands comprises a 600 MHz frequency band, a 640 MHz frequency band, a 790 MHz frequency band, and a 900 MHz frequency band.

18. The mobile wireless device of claim 14, further comprising a plurality of electronic component impedances that are each coupled to a given output of the switching apparatus.

19. The mobile wireless device of claim 18, wherein the plurality of electronic component impedances are configured to effectuate a dual resonance in at least one operational frequency band.

20. A method for switching an operational band of an antenna apparatus, the antenna apparatus comprising a main antenna radiator branch, a plurality of switchable antenna radiator branches and a switching apparatus, the method comprising:

coupling the main antenna radiator branch to a feed point;

coupling the plurality of switchable antenna radiator branches to the switching apparatus; and selectively altering a switching state for the switching apparatus in order to effectuate an operational band change for the antenna apparatus, the selective altering of the switching state comprising coupling one of the plurality of switchable antenna radiator branches to one of a plurality of outputs of the switching apparatus so as to vary an electrical length of the antenna apparatus.

\* \* \* \* \*